United States Patent
Kobler et al.

(10) Patent No.: US 10,550,622 B2
(45) Date of Patent: Feb. 4, 2020

(54) METHOD AND SYSTEM FOR INCREASING THE SAFETY IN THE BOARDING AREA AND FOR OPTIMIZING USAGE OF THE CAPACITY IN TRANSPORT MEANS WHICH COMPRISE AT LEAST ONE LOCALLY FIXED BOARDING AREA

(71) Applicant: SKIDATA AG, Groedig/Salzburg (AT)

(72) Inventors: Richard Kobler, Eugendorf (AT); Thomas Hulan, Strasswalchen (AT)

(73) Assignee: SKIDATA AG, Groedig/Salzburg (AT)

( * ) Notice: Subject to any disclaimer, the term of this patent is extended or adjusted under 35 U.S.C. 154(b) by 406 days.

(21) Appl. No.: 14/854,291

(22) Filed: Sep. 15, 2015

(65) Prior Publication Data

US 2016/0102490 A1    Apr. 14, 2016

(30) Foreign Application Priority Data

Oct. 14, 2014  (EP) .................................... 14188798

(51) Int. Cl.
*E05F 15/73*    (2015.01)
*E05F 15/79*    (2015.01)
(Continued)

(52) U.S. Cl.
CPC ................ *E05F 15/73* (2015.01); *B61B 1/02* (2013.01); *B61B 11/00* (2013.01); *B61B 12/022* (2013.01);
(Continued)

(58) Field of Classification Search
CPC .......... E05F 15/73; E05F 15/40; G05B 15/02; B61B 1/02; B61B 12/022; G06Q 50/30; G07C 11/00; G07C 9/02
See application file for complete search history.

(56) References Cited

U.S. PATENT DOCUMENTS 4,690,064 A * 9/1987 Owen ....................... B61B 1/02
                                                    104/119
5,176,082 A    1/1993 Chun et al.
(Continued)

FOREIGN PATENT DOCUMENTS

| FR | 2678571 A1 | 7/1991 |
| WO | 2006018304 A2 | 2/2006 |
| WO | 2013144850 A1 | 10/2013 |

OTHER PUBLICATIONS

European Search Report of Corresponding European Application No. 141 88 798.4, dated Mar. 23, 2015.

*Primary Examiner* — Walter H Swanson
(74) *Attorney, Agent, or Firm* — Davis & Bujold PLLC; Michael J. Bujold

(57) ABSTRACT

The boarding area (A, B, C) of a transport means is divided into at least two gates (1, 2, 3), the maximum person capacity of which corresponds, respectively, to the maximum capacity of the largest transport device (9) that is accessible via the boarding area (A, B, C). Entrance into the gates (1, 2, 3) is effected via at least one separating device (4) connected with a control system (5) for the purpose of data communication. Entrance into each gate (1, 2, 3) is not possible once the number of persons in the gate (1, 2, 3) specified by the control system (5) for the current boarding operation is reached, or while the persons inside the gate (1, 2, 3) board the transport car. The number of persons in each gate (1, 2, 3) for the current boarding operation is determined by the control system (5) in dependence upon the transport demand in subsequent intermediate stations ahead of an end station, provided such intermediate stations are present, and of the free capacity of the arriving transport car (9). For the current boarding operation, the persons inside each gate (1, 2, 3) are assigned to the arriving transport car (9). When the number of persons inside the gate (1, 2, 3), as (Continued)

specified for the current boarding operation, has been reached, or when a timer which corresponds to a specified time window has expired and the transport car (9) arrives to which the persons currently in the gate (1, 2, 3) are assigned, the persons who are inside the gate (1, 2, 3) are requested to board and a counter for the number of persons in the gate (1, 2, 3) is set to zero.

17 Claims, 2 Drawing Sheets

(51) Int. Cl.
| | |
|---|---|
| *E05F 15/40* | (2015.01) |
| *G07C 11/00* | (2006.01) |
| *G05B 15/02* | (2006.01) |
| *B61B 1/02* | (2006.01) |
| *B61B 12/02* | (2006.01) |
| *G07C 9/02* | (2006.01) |
| *G06Q 50/30* | (2012.01) |
| *B61B 11/00* | (2006.01) |

(52) U.S. Cl.
CPC .............. *E05F 15/40* (2015.01); *E05F 15/79* (2015.01); *G05B 15/02* (2013.01); *G06Q 50/30* (2013.01); *G07C 9/02* (2013.01); *G07C 11/00* (2013.01); *E05F 2015/763* (2015.01); *G07C 2011/04* (2013.01)

(56) References Cited

U.S. PATENT DOCUMENTS

| | | | | |
|---|---|---|---|---|
| 5,478,995 | A | * 12/1995 | Wallerstorfer | G04B 37/1446 235/382 |
| 5,485,347 | A | 1/1996 | Miura | |
| 2004/0011240 | A1 | * 1/2004 | Gabriel | B61B 1/02 104/173.1 |
| 2008/0290989 | A1 | * 11/2008 | Kudelski | A63C 11/005 340/5.7 |
| 2010/0063632 | A1 | * 3/2010 | Tate | B61B 1/02 700/275 |
| 2012/0245769 | A1 | 9/2012 | Creissels | |
| 2014/0096447 | A1 | * 4/2014 | Harucksteiner | E06B 11/08 49/31 |
| 2014/0352229 | A1 | * 12/2014 | Gustafson | E04H 14/00 52/30 |

* cited by examiner

METHOD AND SYSTEM FOR INCREASING THE SAFETY IN THE BOARDING AREA AND FOR OPTIMIZING USAGE OF THE CAPACITY IN TRANSPORT MEANS WHICH COMPRISE AT LEAST ONE LOCALLY FIXED BOARDING AREA

BACKGROUND OF THE INVENTION

The present invention relates to a method for increasing the safety in the boarding area and for optimizing usage of the capacity in transport means or system, which comprise at least one locally fixed boarding area for the transport cars. Furthermore, the invention relates to a system for increasing the safety in the boarding area and for optimizing usage of the capacity in a transport means which comprises at least one locally fixed boarding area.

It is known from the state of the art, with transport means comprising at least one locally fixed boarding area such as for cable cars in skiing locations, to arrange the necessary access control devices in front of the boarding area, wherein the persons to be transported, following the check that they have access authorization, wait in the boarding area for the arrival of the transport cars in order to board.

However, this may lead to a loss in comfort, in particular during peak times, because many people are waiting inside a confined space. Disadvantageously this may also lead to accidents because too many people are in the vicinity of the arriving transport cars. Also accidents may occur during boarding when a lot of people are simultaneously trying to board the same transport car.

A further disadvantage consists in that, as a rule even at peak times, there are empty spaces in the transport car, because groups of people standing directly in front of the door of the transport car want to stay together so that the free seats available in the transport car are not sufficient to take all of them. In particular, with an indexing transport means, the transport car moves on without having exhausted its capacity.

Furthermore at peak times, such as in skiing areas, it may happen that with transport means having one or more intermediate stations between the start and end stations, the waiting times for the passengers wanting to board at an intermediate station are very long because the arriving transport cars are fully occupied.

Moreover a great many human resources are required in order to monitor the boarding areas, in particular at peak times, in order to interrupt operation of the transport means in case an accident or irregularity happens during the boarding process.

SUMMARY OF THE INVENTION

The principal objective of the present invention is to provide a method for increasing safety in the boarding area and for optimizing usage of the capacity in transport means which comprises at least one locally fixed boarding area, which method, when executed, has the effect of avoiding the disadvantages known from the state of the art. A further objective is to provide a system for increasing safety in the boarding area and for optimizing usage of the capacity in transport means which comprises at least one locally fixed boarding area, and in particular for carrying out the method according to the invention.

As used herein, the term "gate" is intended to mean a closed in area, similar to a "lock" or "sluice" for a water channel or canal, that has open-able barriers to regulate the flow or movement in and out of the gate. The term "transport means" is intended to mean any type of system, such as a train system or cable-car system, for transporting people from one place to another. Such a transport means includes a plurality of stations with boarding areas to embark and disembark, at least one "transport car," such as a cable car, and tracks or cables and such other infrastructure as is required for a transport system to function.

According to the present invention a method is proposed for increasing safety in the boarding area and for optimizing usage of the capacity in transport means comprising at least one locally fixed boarding area, where the boarding area comprises at least two "gates", the maximum personnel capacity of which respectively corresponds to the maximum capacity of the largest transport car accessible via the boarding area; wherein entrance into the gates takes place, respectively, via at least one separating device; wherein access to the gate is not possible once the number of persons specified for the current boarding operation in the gate is reached or while the people currently inside the gate are boarding a transport car; wherein the specified number of persons inside the gate is defined by a control system in dependence of the transport demand in subsequent intermediate stations ahead of the end station, if existing, and of the free capacity of the arriving transport car; and wherein the persons inside a gate are assigned to an arriving transport car.

The number of persons specified for the current boarding operation may correspond to the maximum capacity of persons of a gate, such as, when the arriving transport car has the same capacity and is empty and no intermediate station is provided ahead of the end station. In a case where the transport car are cable cars of a fun ride business or cable cars of a cable car system with a start station and an end station without intermediate stations, the specified number of persons corresponds to the maximum capacity of persons of a gate, which in turn corresponds to the capacity of a cable car.

The number of persons currently inside a gate is detected via the at least one separating device and forwarded to the control system, wherein, when the number of persons specified for the current boarding operation in the gate is reached or when a specified timer corresponding to a specified time window has expired and a transport car is arriving, to which the persons currently inside the gate have been assigned, the persons currently inside the gate are requested to board, and a counter for the number of persons inside the gate is set to zero.

The area of the gates facing the boarding area is preferably open. Alternatively a suitable device such as a barrier connected with the control system for the purpose of data communication may be provided in the region of the gates facing the boarding area, which device when operated in opening direction allows access to a transport car, when the persons inside the gate are requested to board. The call to board may be effected via an indicating device and/or acoustically.

The separating devices, in terms of a further development of the invention, may serve as access control devices for the transport means, whereby the operating and maintenance cost are reduced because there is no longer any need for separate access control devices.

Each of the gates comprises an indicating device facing the persons seeking access to the gates, which is connected with the control system for the purpose of data communication, which indicating device indicates in real time the number of free spaces for the current boarding operation relative to the specified number of persons inside the gate. Furthermore each of the gates comprises an indicating device facing the persons seeking access to the gates, which is connected with the control system for the purpose of data communication, which indicates whether there is a delay in starting the boarding operation or whether the boarding operation has started, wherein this information can, for example, be indicated via pictograms or a traffic light. Alternatively or in addition to the indication of the status of boarding this may be effected via acoustic signals.

In terms of a further development each gate merely comprises an indicating device facing the persons inside the gate and seeking access to the gates, which is connected with the control system for the purpose of data communication, which indicating device, on the one hand, indicates in real time the number of free spaces for the current boarding operation relative to the specified number of persons inside the gate and on the other, the status of the boarding operation (e.g. waiting/boarding).

Due to the information indicated on the indicating devices one can recognise prior to admission, whether for example, there is sufficient space for a family or group of persons to be transported together in one of the next transport car, or whether they should let others pass and wait for admission into a further gate or into the same gate at a later stage so that everyone can be transported together in the same transport car. By making these assignments at a preliminary stage away from the boarding area, the search for a transport car becomes obsolete and stress is reduced. The method according to the invention leads to direct straight movement patterns in the boarding area and crossing traffic flows are avoided.

Preferably, each of the transport car has a different identification number or other marking clearly visible to the persons in the boarding area, wherein the passengers waiting in a gate are requested, via the indicating device and/or via acoustic signals, either to wait or to board a transport car with a specified identification number.

The free capacity and arrival time of a transport car is evaluated in the control system based on its identification number or other marking clearly visible to the persons in the boarding area and on the number of persons already in the transport car, which number is ascertained based on the data of the separating devices of the gates for the boarding operation into the transport car, in order to determine, in dependence of the transport demand at subsequent intermediate stations ahead of the end station (provided intermediate stations exist) a gate and the specified number of persons inside it, for a current boarding operation in a boarding area, and to assign the persons inside this gate to an arriving transport car.

In case at least one intermediate station exists apart from the a start station and an end station, the number of persons waiting at the various stations is ascertained prior to reaching the gates by means of devices arranged in front of the gates for ascertaining the number of persons waiting for transport in front of the gates, which devices may e.g. also serve as access control devices or are realised as light barriers and which are connected with the control system for the purpose of data communication, so that the transport demand at individual stations is known to the control system in real time.

With this arrangement the number of persons detected by these devices and arriving in front of the gates of a boarding area and the number of persons detected by the separating devices of the gates of the boarding area (which corresponds to the number of persons already transported or about to be transported) serves as a basis for ascertaining the number of persons waiting at the various stations prior to reaching the gates. This data is evaluated in real time in the control system together with the status of all currently available free capacities of the transport means. Based on this data control of the gates at individual stations is optimized, wherein due to the comprehensive detection of the passenger flows at all stations the load factor in individual transport car can be retrieved in real time.

As an alternative to ascertaining the number of arriving persons and calculating the number of waiting persons on the basis of the arriving and already transported persons, the number of persons waiting at the various stations can be ascertained in real time based on the evaluation of camera images.

According to the invention at least two gates per boarding area are provided, wherein, the more gates are provided the more possibilities there exist for the flexible control of the boarding operations. For example, for a specified time span one of the gates may be assigned to persons with children, to women, to trips to certain stations, to VIPs or as a fast lane.

The method according to the invention is suitable for use with either indexing or non-indexing transport means, for fun ride businesses or for lifts in high-rise buildings.

The system according to the invention for increasing safety in the boarding area and for optimizing usage of the capacities in transport means which comprise at least one locally fixed boarding area, comprises, in terms of a particularly advantageous embodiment, at least two gates per boarding area of a transport car, via which entrance into the transport car is possible and the maximum person capacity of which respectively corresponds to the maximum capacity of the largest transport car accessible via the boarding area, wherein the gates comprise at least one separating device connected with a control system of the system according to the invention for the purpose of data communication, via which entrance into the gate is effected and which detects the current number of persons inside the gate and forwards this to the control system. Entrance into the gate is not possible once the number of persons in the gate specified by the control system for the current boarding operation has been reached, wherein each of the gates comprises an indicating device connected with the control system for the purpose of data communication, which indicates the number of free spaces for the current boarding operation relative to the specified number of persons in a gate and the status of the boarding operation.

As already explained the separating devices of the system may also serve as access control devices for the transport means.

In cases where apart from a start station and an end station at least one intermediate station exists, the transport means or system comprises devices connected with the control system for the purpose of data communication for ascertaining the number of persons waiting in front of the gates, which devices detect the number of persons arriving in front the gates, wherein, based on the number of arriving persons and the number of persons detected by the separating devices of the gates, which number corresponds to the number of persons already transported or about to be transported, the control system ascertains in real time the number of persons waiting at various stations prior to reaching the gates. The devices for ascertaining the number of persons waiting in front of the gates may be realised as access control devices, light barriers or cameras.

Due to the method and system according to the invention it is ensured that the limit on the number of persons inside the boarding area leads to safe and comfortable boarding. In addition safety is increased because the maximum number of persons who can dwell in the boarding area is regulated. This ensures that should people have to be evacuated, such as in case of a fire the station can be evacuated quickly.

Furthermore the capacities of the transport means are optimally utilized because the transport car each start with the optimized number of persons within a specified time window, taking account of the persons waiting for this transport car at the next station (if existing). This allows human resources required in the boarding area to be reduced, so that there is available capacity for further activities. The method according to the invention is characterized by a fully automatic approach which due to the intuitive control of the passenger flows permits a reduction in human resources to the prescribed minimum without having to reduce the speed of a system in the case of an indexing transport means.

For a full understanding of the present invention, reference should now be made to the following detailed description of the preferred embodiments of the invention as illustrated in the accompanying drawings.

DETAILED DESCRIPTION OF THE PREFERRED EMBODIMENTS

Figure 1:
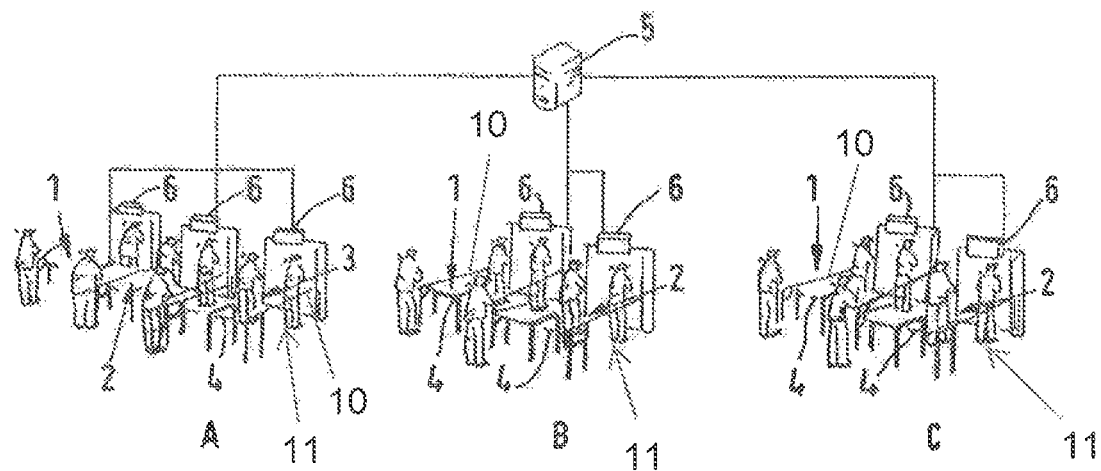
FIG. 1 is a schematic drawing of the gates provided according to the invention for the boarding area of three stations.

The preferred embodiments of the present invention will now be described with reference to FIGS. 1-3 of the drawings. Identical elements in the various figures are identified with the same reference numerals.

According to the invention and referring to FIG. 1 the boarding area of a transport means is divided into at least two gates, the maximum person capacity of which corresponds to the maximum capacity of the largest transport car, which can be boarded via the boarding area. In the example shown in FIG. 1 three locally fixed boarding areas A, B, C are shown, which are associated with respectively different stations of the transport means, wherein the boarding area A of the start station is divided into three gates 1, 2, 3 and the boarding areas B, C of the intermediate stations are divided into two gates 1, 2, respectively.

Entrance into the gates 1, 2, 3 is effected via at least one separating device 4 connected with a control system 5 such as a server for the purpose of data communication, wherein entrance into the gate 1, 2, 3 is not possible once the number of persons in the gate 1, 2, 3 specified by a control system 5 for the current boarding operation is reached or while the persons inside the gate 1, 2, 3 board a transport means.

In the example shown the gates 1, 2, 3 comprise an indicating device 6 facing the persons inside the gate 1, 2, 3 respectively and connected with the separating devices 4 and the control system 5 for the purpose of data communication, which device indicates, in real time, the number or free spaces for the current boarding operation relative to the specified number of persons inside the gate 1, 2, 3. Furthermore the indicating device 6 indicates whether there is a wait until boarding can take place or whether according to the signals of the control system 5 the boarding operation has started, wherein this information and also a request to board may be indicated by pictograms for example.

Each of the transport cars comprises a unique identification number or other marking visible to the persons in the gate area, wherein the passengers waiting at a gate 1, 2, 3 are requested via the indicating device 6 either to wait or to board a transport car with a specified identification number.

Via the identification number or other marking and the number of persons in a transport car ascertained in the control system on the basis of the data from the separating devices of the gates of the system, the free capacity and the arrival time of a transport car can be used in the control system 5, in order to, in dependence of the transport demand at subsequent intermediate stations ahead of an end station, given that intermediate stations exist, determine a gate 1, 2, 3 and the specified number of persons inside it for a current boarding operation, and to assign the persons in this gate arriving transport car. The transport cars are connected with the control system for the purpose of data communication, so that their position, identification number and degree of loading is known. Additional detecting techniques such as cameras or infrared sensors can be 4-optionally integrated with individual transport car for detecting the current overall status and supply real time data to the control system 5.

According to the invention, as already explained, the number of persons inside a gate 1, 2, 3 specified for the current boarding operation is determined by the control system 5 using defined criteria in dependence of the transport demand in subsequent intermediate stations ahead of the end station (given that intermediate stations exist as in the example shown) and of the free capacity of the arriving car, wherein the persons inside a gate 1, 2, 3 are assigned to an arriving transport cars for the current boarding operation.

The control system 5 can determine the number of persons specified for the current boarding operation for each respective gate 1, 2, 3 of the boarding areas A, B, C using various criteria. For example, given the case that apart from a start station and an end station an intermediate station exists, the number of persons waiting in the various stations can be determined prior to reaching the gates 1, 2, 3 by means of suitable devices serving e.g. as access control devices or realised as light barriers and connected with the control system 5 for the purpose of data communication, so that the transport demand at individual stations is known in the control system 5 in real time. The transport demand and the free capacities can be used by the control system 5 to determine, by means of corresponding algorithms, the number of persons specified for the current boarding operation for each gate 1, 2, 3 of the boarding areas A, B, C. Various criteria, such as shortening of the waiting time at one or at all intermediate stations, shortening of the waiting time at the start station or shortening of the waiting time in the station with the highest number of waiting persons etc. can be utilized.

The specified number of persons inside a gate 1, 2, 3 for the current boarding operation may correspond to the maximum person capacity of a gate, e.g. in a case when the arriving transport car has the same capacity and is empty, and no intermediate station ahead of the end station is provided or when there is no one waiting in the intermediate station (if existing).

The current number of persons inside a gate 1, 2, 3 for the current boarding operation is detected via the at least one separating device 4 and forwarded to the control system 5, wherein, once the specified number of persons inside the gate 1, 2, 3 for the current boarding operation has been reached or a specified timer corresponding to a specified time window has expired, and a transport car arrives which has the persons currently inside the gate 1, 2, 3 assigned to it, the persons inside the gate 1, 2, 3 are requested to board via the indicating device 6 or optionally by acoustic signals, and a counter for the number of persons inside the gate 1, 2, 3 is set to zero. The timer ensures that in particular with an indexing transport means, operation is not disadvantageously affected.

In terms of further variants of the method it is possible to alter the assignment of the persons inside a gate to a transport car, if the number of persons specified for the current boarding operation in this gate is not reached, but is reached in another gate of the boarding area so that the free capacity of the transport car can be utilized.

For special needs such as wheelchair or pram transport operating personnel is able to manually interrupt or override the program flow at individual stations.

Figure 2:
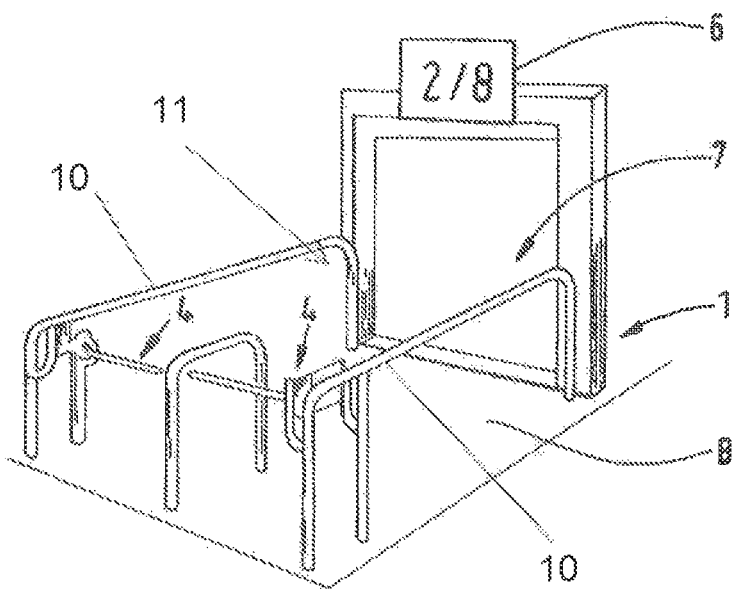
FIG. 2 is a schematic drawing of a gate according to the invention.

With reference to FIG. 2 the area 7 of a gate 1 of the system and method according to the invention facing the boarding area is open. Alternatively a suitable device such as a barrier connected with the control system 5 for the purpose of data communication may be provided in the region of the gates facing the boarding area, which device when operated in opening direction allows access to a transport car, when the persons inside the gate are requested to board.

A preferred variant of the method according to the invention is illustrated with reference to FIG. 3. Here the boarding area of a start station A of a cable car system with cable cars 9 is marked with the reference symbol A, and this is divided into three gates 1, 2, and 3. The gates 1, 2, 3 are realized as shown in the example of FIG. 2. They respectively comprise at least one separating device connected with the control system 5 for the purpose of data communication and respectively one indicating device facing the persons inside a gate 1, 2, 3. The indicating device is connected with the separating devices and the control system 5 for the purpose of data communication, which indicates the free spaces for the current boarding operation relative to the specified number of persons waiting-inside the gate 1, 2, 3 and the status of the boarding operation. In FIG. 3 the passenger flows are indicated by arrows.

In the example shown access control devices 8 are provided in front of the gates 1, 2, 3, which are actuated in opening direction in case of valid access authorization, in order to allow these persons access, and via which the number of waiting persons are ascertained prior to reaching the gates 1, 2, 3 in conjunction with the persons already transported or about to be transported within the boarding area.

The access control devices 8 are connected with the control system 5 for the purpose of data communication. Based on the number of valid access authorisations (corresponding to the number of arriving persons) and the number of persons detected by the separating devices of gates 1, 2, 3 (corresponding to the number of persons already transported or about to be transported), the number of persons waiting for transport in front of the gates 1, 2, 3 is known at any time.

If in terms of further embodiments the separating devices 4 are realised as access control devices, further suitable devices for ascertaining the persons waiting for transport in front of the gates 1, 2, 3, such as light barriers or cameras may be used for ascertaining the number of persons waiting for transport in front of the gates 1, 2, 3, which detect the number of arriving persons and forward these numbers to the control system 5.

Figure 3:
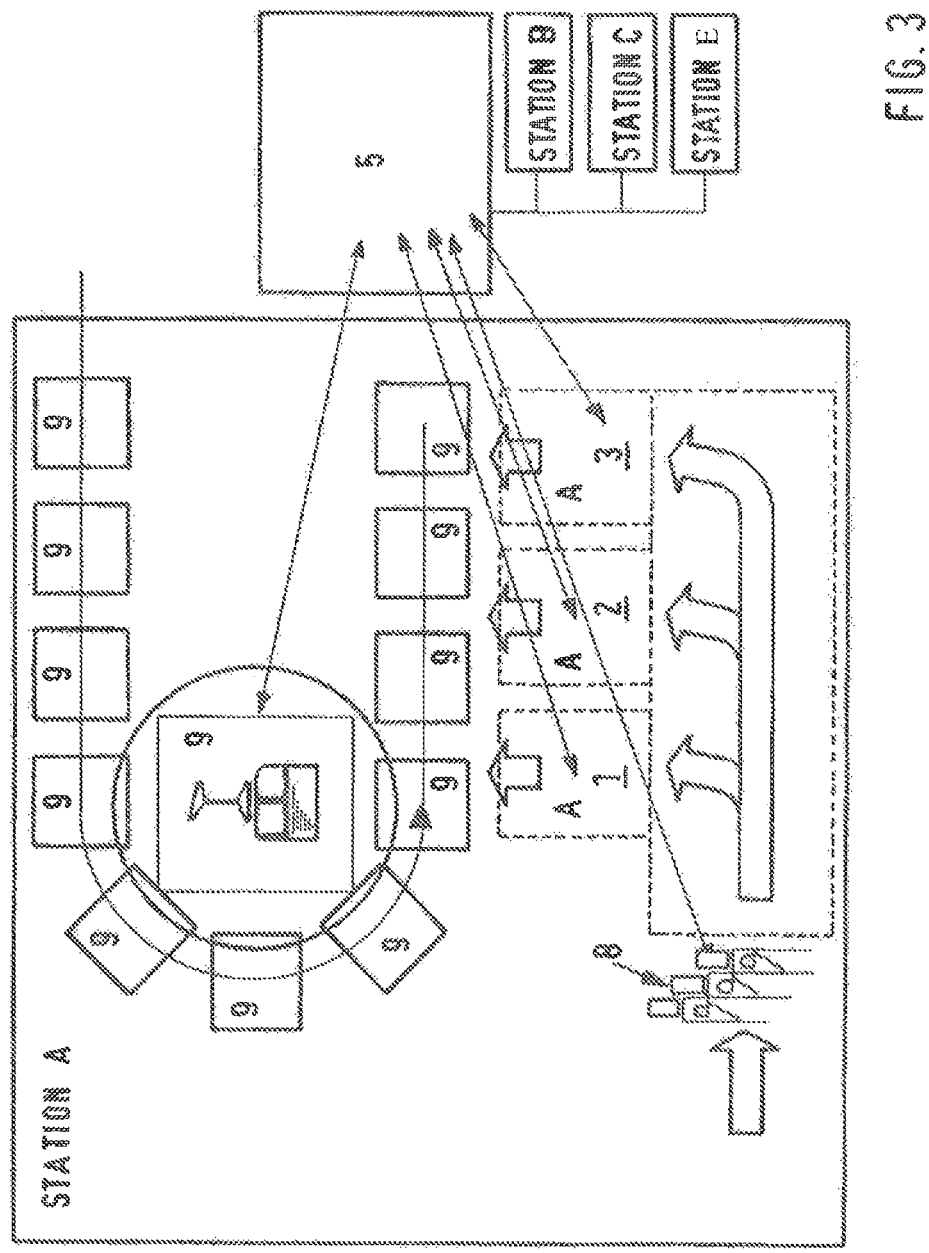
FIG. 3 is a schematic drawing of the layout of the boarding area A of the start station shown in FIG. 1 in the case of a cable car system for illustrating the method according to the invention.

The intermediate stations B', C' etc. are laid out analogously to the example shown in FIG. 3, so that the control system 5 knows, in real time, how many persons are waiting at which station, whereby the number of persons specified for the current boarding operation for each gate of the boarding areas A, B, C can be determined in dependence of the transport demand and the free capacities based on various criteria such as shortening the waiting time at one or all intermediate stations, shortening the waiting time at the start station or shortening the waiting time at the station with the highest number of waiting persons.

In the example shown three gates 1, 2, 3 are provided, wherein in terms of further developments four or more gates may be provided which increases the flexibility of the system.

There has thus been shown and described a novel method and system for increasing the safety in a transport boarding area which fulfills all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

What is claimed is:

1. A method for increasing boarding area safety and optimizing a usage capacity of a cable car system which comprises a plurality of cable cars and at least one station with a fixed boarding area (A, B, C) at a start station, said method comprising:

dividing the boarding area (A, B, C), via rails, into a plurality of separate gates (1, 2, 3), with each gate (1, 2, 3) defining a respective area (7) which is confined by the rails and at least one respective separating device (4) but having an opening adjacent an end of the respective gate (1, 2, 3), facing toward the cable cars, located at the boarding area (A, B, C), through which boarding passage to an assigned one of the cable cars is permitted, each respective gate (1, 2, 3) being able to accommodate a maximum person capacity which corresponds, respectively, to a maximum person capacity of a largest one of the cable cars that is accessible via the boarding area (A, B, C);

locating the at least one respective separating device (4), before the respective area of each respective gate (1, 2, 3), for controlling access of persons to the respective gate (1, 2, 3);

only permitting entrance to each respective gate (1, 2, 3) via the respective at least one separating device that is coupled with a control system for purpose of data communication;

detecting and sending to the control system, via each respective at least one separating device, a number of persons waiting in each of the respective gates;

determining, by the control system depending upon a transport demand of the cable car system and a free capacity of each one of the cable cars, arriving at the boarding area (A, B, C), the number of persons in each respective gate that is specified for a current boarding operation;

once the number of persons located within the respective gate, specified by the control system, is reached or while the persons located within the respective gate are boarding the assigned one of the cable cars located at the boarding area (A, B, C), blocking entrance to the respective gate (1, 2, 3) via the respective at least one separating device;

assigning the persons currently located within each respective gate to one of the cable cars located at the boarding area (A, B, C) and requesting the persons waiting within the respective gate to board the respectively assigned one of the cable cars located at the boarding area (A, B, C); and then setting a counter, for the number of persons located within each respective gate, back to zero.

2. The method according to claim 1, further comprising:

evaluating the free capacity and an arrival time of the each one of the cable cars arriving at the boarding area (A, B, C) by the control system, by way of an identification number or other marking clearly visible to the persons within the boarding area (A, B, C) and ascertaining a number of persons located inside each arriving cable car, based on data of the respective at least one separating device of the respective gates (1, 2, 3) for the current boarding operation into the cable car; and determining a specified number of persons in each of said gates for the current boarding operation in the boarding area (A, B, C) and assigning the persons in this gate (1, 2, 3) to one of the cable cars located at the boarding area (A, B, C), in dependence upon the transport demand in any subsequent intermediate station located before an end station of the cable car system.

3. The method according to claim 2, further comprising:

indicating in real time a number of free spaces for the current boarding operation relative to the specified number of persons in each respective gate (1, 2, 3) together with a status of the current boarding operation, on an indicating device, oriented to face the persons seeking admission to the respective gate (1, 2, 3) and the persons waiting within the respective gates (1, 2, 3), and coupling the indicating device for data communication with the control system.

4. The method according to claim 1, wherein an intermediate station is present in the cable car system together with the start station and an end station, the method further comprising:

ascertaining a number of persons waiting at at least one station's boarding areas prior to the persons reaching each of the respective gates (1, 2, 3) by devices for ascertaining the number of persons waiting for transport in front of the respective gates (1, 2, 3) at that the at least one station, which devices are coupled with the control system for data communication, such that a transport demand at each individual station is known to the control system in real time.

5. The method according to claim 4, wherein the number persons waiting at various stations is ascertained prior to the persons reaching the respective gates (1, 2, 3), by the devices for ascertaining the number of persons waiting for transport in front of the respective gates (1, 2, 3), the number of persons arriving at the respective gates (1, 2, 3) and the number of persons detected by the respective at least one separating device of the respective gates (1 2, 3), which correspond to the number of persons already transported and about to be transported.

6. The method according to claim 4, further comprising ascertaining the number of persons waiting at the intermediate station, the start station and the end station prior to reaching the gates by evaluating camera images.

7. The method according to claim 4, further comprising determining the number of persons specified for the current boarding operation for each one of the respective gates (1, 2, 3) of the boarding areas (A, B, C) in dependence upon the transport demand in each subsequent intermediate station located before the end station of the cable car system and said free capacity of each arriving cable car, based upon criteria including at least one of (i) shortening a waiting time at at least one intermediate station, (ii) shortening a waiting time in the start station, and (iii) shortening a waiting time in a station with a majority of waiting persons.

8. The method according to claim 1, further comprising using at least one access control device (8), for determining valid access authorization of each person attempting to board one of the cable cars, located at the boarding area (A, B, C), prior to such person gaining access to any one of the plurality of gates (1, 2, 3).

9. A cable car system for increasing a boarding area safety and optimizing a usage of capacity in cable cars and at least one station with a locally fixed boarding area (A, B, C), said cable car system comprising, in combination:

an electronic control system;

rails for dividing the locally fixed boarding area (A, B, C) into a plurality of separate gates (1, 2, 3) through which loading to an assigned one of an arriving cable car is permitted, each of the plurality of separate gates (1, 2, 3) having an area being defined by the rails and at least one respective separating device (4) so that each one of the respective areas of the respective gates (1, 2, 3) having an opening, adjacent an end of the respective gate (1, 2, 3) facing the cable cars located at the boarding area (A, B, C), through which boarding passage to the assigned one of the cable cars is permitted, each respective area of each respective gate (1, 2, 3) being size so as to accommodate a maximum person capacity which corresponds, respectively, to a maximum capacity of a largest one of the cable cars that is accessible via the boarding area (A, B, C), wherein each of said at least one separating devices being coupled with the control system for data communication, and the at least one separating devices determining and forwarding to the control system a current number of persons waiting at each of the respective areas of the respective gates (1, 2, 3);

at least one of the respective separating devices (4) being located at an entrance into each respective gate (1, 2, 3) for controlling entry and access of persons to the respective gate (1, 2, 3);

once a number of persons located inside each respective gate (1, 2, 3), specified by the control system for a current boarding operation, is reached, the respective at least one separating device preventing further access by any person to the respective gate (1, 2, 3); and each of the respective gates (1, 2, 3) comprises an indicating device, coupled with the control system for data communication, for indicating a number of free spaces specified for the current boarding operation relative to the specified number of persons in each respective gate (1, 2, 3) and a status of the boarding operation.

10. The cable car system according to claim 9, wherein each of the respective at least one separating devices also serve as access control devices for the cable car system.

11. The cable car system according to claim 9, wherein, at least one intermediate station, apart from a start station and an end station, is present, the cable car system further comprises devices, coupled with the control system for the purpose of data communication, for ascertaining a number of persons waiting in front of each gate (1, 2, 3), which devices detect a number of persons arriving in front of each gate (1, 2, 3); and, based on the number of arriving persons and the number of persons detected by the respective separating devices of the respective gates (1, 2, 3), which corresponds to a number of persons already transported or about to be transported, the number of persons waiting at various stations is transmitted to the control system prior to the assigned one of the arriving cable car reaching the respective gates (1, 2, 3).

12. The cable car system according to claim 11, wherein the devices for ascertaining the number of persons waiting at each of the respective gates (1, 2, 3) are selected from the group consisting of access control devices, light barriers and cameras.

13. The cable car system according to claim 9, wherein the respective indicating device is located above the opening adjacent the end of each of the respective gates (1, 2, 3) facing toward the arriving cable cars located at the boarding area (A, B, C).

14. The cable car system according to claim 9, further comprising a device, coupled with the control system for data communication, which, when actuated in an opening direction, allows access to the assigned cable car, when the persons in each respective gate (1, 2, 3) are requested to board.

15. The cable car system according to claim 9, further comprising at least one access control device (8), for determining valid access authorization of each person attempting to board one of the cable cars, located at the boarding area (A, B, C), prior to each such person gaining access to any one of the plurality of gates (1, 2, 3).

16. The cable car system according to claim 9, wherein each respective indicating device, during operation, assigning the persons currently located within the respective gate to one of the cable cars located at the boarding area (A, B, C) and requesting the persons waiting within the respective gate to board the respectively assigned arriving cable car; and following boarding, a counter, for the number of persons located inside each respective gate, being set back to zero.

17. A cable car system for increasing a boarding area safety and optimizing a usage of capacity in cable cars for at least one station having a fixed boarding area, the cable car system comprising:
a control system;
a plurality of rails dividing the boarding area into a plurality of separate gates, with each separate gate defining a respective waiting area which is confined by the rails and at least one respective separating device but each respective waiting area having an opening, adjacent an end of the respective gate facing toward the cable cars, located at the boarding area (A, B, C), through which boarding passage to an assigned one of the cable cars, located at the boarding area (A, B, C), being permitted, each respective waiting area of each respective gate being size so as to accommodate a maximum person capacity which corresponds, respectively, to a maximum person capacity of a largest one of the cable cars that is accessible via the boarding area;
the at least one respective separating device being located before the respective waiting area of the respective gate for controlling access of persons to the respective gate;
entrance to each respective gate being controlled via the respective at least one separating device that is coupled with the control system for data communication;
each respective at least one separating device detects and sends to the control system a number of persons waiting at the respective gate;
the control system, depending upon a transport demand of the cable car system and a free capacity of each one of the cable cars arriving at the boarding area (A, B, C), determining the number of persons in each respective gate that is specified for a current boarding operation;
once the number of persons located within the respective gate, specified by the control system, is reached or while the persons located within the respective gate are boarding the assigned one of the cable cars, located at the boarding area (A, B, C), the respective at least one separating device blocking entrance to the respective gate;
assigning the persons currently located within each respective gate to one of the cable cars located at the boarding area (A, B, C) and requesting the persons waiting within the respective gate to board the respectively assigned one of the cable cars; and
following boarding, a counter, for the number of persons located within each respective gate, is set back to zero.

* * * * *